(12) United States Patent
Fryshman

(10) Patent No.: US 9,131,536 B2
(45) Date of Patent: Sep. 8, 2015

(54) INDUCTION COOKING APPARATUS AND METHOD OF USE

(76) Inventor: Bernard Fryshman, Brooklyn, NY (US)

( * ) Notice: Subject to any disclaimer, the term of this patent is extended or adjusted under 35 U.S.C. 154(b) by 778 days.

(21) Appl. No.: 13/372,654

(22) Filed: Feb. 14, 2012

(65) Prior Publication Data

US 2013/0153565 A1  Jun. 20, 2013

Related U.S. Application Data

(60) Provisional application No. 61/442,369, filed on Feb. 14, 2011.

(51) Int. Cl.
| H05B 6/12 | (2006.01) |
| A47J 39/00 | (2006.01) |
| C23C 14/24 | (2006.01) |
| H05B 6/02 | (2006.01) |
| H05B 6/10 | (2006.01) |

(52) U.S. Cl.
CPC .................. H05B 6/02 (2013.01); H05B 6/105 (2013.01); H05B 6/12 (2013.01)

(58) Field of Classification Search
CPC ............ H05B 6/02; H05B 6/12; H05B 6/105
USPC ......... 219/620–627, 635, 601, 643, 658, 730; 126/27, 42, 90 A, 246, 375.1; 99/393, 99/385; 220/573.1, 573.2; 427/248.1, 250, 427/345, 561, 569; 148/573, 575, 664; 165/48.1

See application file for complete search history.

(56) References Cited

U.S. PATENT DOCUMENTS

| 3,138,698 A | * | 6/1964 | Wells et al. .................... 219/441 |
| 4,020,310 A | * | 4/1977 | Souder et al. ................. 219/621 |
| 4,776,386 A | * | 10/1988 | Meier ........................... 165/48.1 |
| 5,366,764 A | * | 11/1994 | Sunthankar ................. 427/248.1 |
| 5,466,915 A | * | 11/1995 | Meier et al. .................... 219/622 |
| 5,508,498 A | * | 4/1996 | Rheinish et al. .............. 219/730 |
| 5,628,241 A | | 5/1997 | Chavanaz et al. |
| 5,665,263 A | | 9/1997 | Gaspard |

OTHER PUBLICATIONS

Non-Final Office Action on U.S. Appl. No. 14/078,297, mailed Mar. 24, 2015.
Notice of Allowance on U.S. Appl. No. 14/078,297, mailed May 18, 2015.

* cited by examiner

*Primary Examiner* — Quang Van
(74) *Attorney, Agent, or Firm* — Foley & Lardner LLP

(57) ABSTRACT

A cooking apparatus includes a cooking vessel, a support structure, an assortment of ferrous members and a source of electro-magnetic radiation. The ferrous members are mounted on the support structure along with food. The source of electro-magnetic radiation heats the ferrous members and enables a previously unobtainable level of precision and control in the preparation of food.

15 Claims, 5 Drawing Sheets

INDUCTION COOKING APPARATUS AND METHOD OF USE

RELATED APPLICATIONS

This application claims priority from my provisional patent application titled Novel Cooking Method, Ser. No. 61/442,369 filed on Feb. 14, 2011.

FIELD OF THE INVENTION

The present invention relates generally to the field of equipment for cooking and more particularly to an induction cooking apparatus and a method of induction cooking.

BACKGROUND OF THE INVENTION

Induction cooking is similar to other forms of cooking in that it uses a heated cooking vessel such as a pot or a pan to transfer heat to the food contained in the vessel. Induction cooking differs in that the vessel itself is the source of the heat, receiving its energy through electro magnetic radiation which creates the heat in the walls of the vessel. The heat then reaches the food, from the vessel walls inward.

To function, the vessel must be made of a ferrous or similar material. Sometimes, an adaptor is used to enable a non ferrous pot or pan to be used. The adaptor then becomes the source of the heat. Adaptors are sometimes called induction discs.

Despite the developments of the prior art there remains a need for an induction cooking apparatus which provides targeted application of heat.

OBJECTS AND SUMMARY OF THE INVENTION

It is an object of the present invention to provide an induction cooking apparatus which provides targeted heating of food enabling elective cooking of different parts of the food.

Another object of the present invention is to provide a method for induction cooking which provides improved heating uniformity.

Another object of the present invention is to provide an induction cooking apparatus which incorporates pieces of metal of varying sizes and shapes which are distributed within the cooking vessel to vary the heating pattern.

Another object of the present invention is to provide an induction cooking apparatus in which inserts are inserted into food for the purpose of heating and cooking the food.

Yet another object of the present invention is to provide an induction cooking apparatus to incorporate a relatively small of number of component parts which can be manufactured economically in volume, resulting in a low unit cost.

These and other objects and advantages of the present invention will become evident hereinafter.

In accordance with the present invention, an induction cooking apparatus includes a cooking vessel, a support structure, and a plurality of ferrous elements which are placed throughout the interior of the cooking vessel and are typically mounted on the support structure so that the source of heat is dispersed and distributed enabling a previously unavailable level of heat precision and control in the preparation of food.

Ferrous and similar pieces of metal of varying shapes, sizes, number, and magnetic/conducting properties are distributed throughout the vessel. Each becomes a source of heat so that the food is cooked according to the specifications of the preparer. No longer does the heat travel only from the enveloping heated vessel, (or from the flame which is directed at the food). The heat can travel from a number of separate sources, from inside the cooking vessel, therefore enabling a new level of uniformity—or differentiation—as the case (and desire) may be.

BRIEF DESCRIPTION OF DRAWINGS

Additional features and advantages of the present invention will be made clear in the following specification taken with the drawings in which.

DETAILED DESCRIPTION OF THE INVENTION

Figure 1:
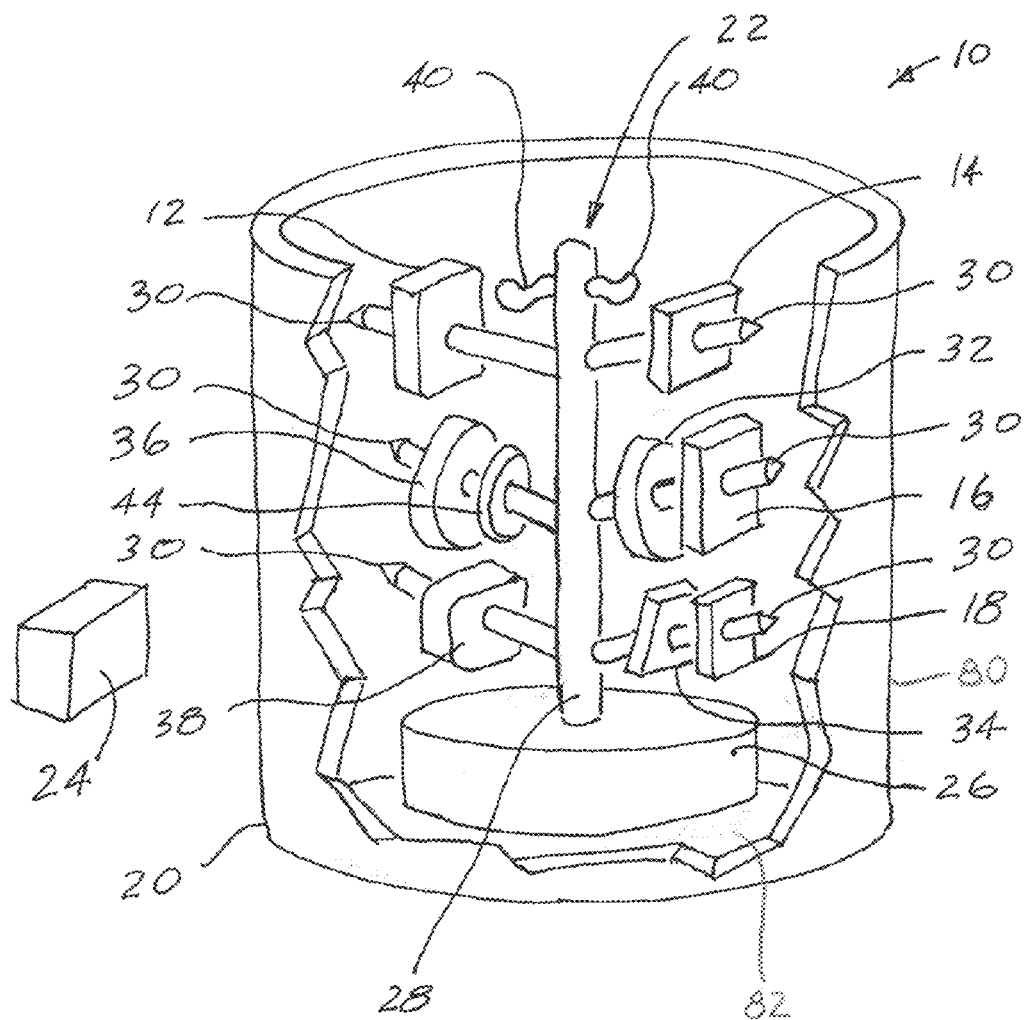
FIG. 1 is an overall perspective view of the induction cooking apparatus according to the present invention with the apparatus shown in use and with a portion of the apparatus shown broken away to reveal details of internal construction.

With reference to the drawings there is shown in FIGS. 1-5 an induction cooking apparatus 10 made in accordance with the present invention, with the apparatus 10 shown in use cooking food items 12, 14, 16, 18. The apparatus 10 includes a cooking vessel 20, a support structure 22 and a source of electro-magnetic radiation 24. The source of electro-magnetic radiation 24 is of conventional construction which is well known in the art and, accordingly, the source of electro-magnetic radiation 24 is represented schematically in FIG. 1 by a rectangular prism. The source of electro-magnetic radiation 24 is capable of producing radiation in a range of power levels and a range of frequencies.

The cooking vessel 20 is a container of generally conventional design and may be made of a non-ferrous material. or, alternatively, of a non ferrous material with a ferrous bottom surface to facilitate two modes of cooking. Induction cooking is accomplished according to the present invention and also conventional cooking may be accomplished using a conventional stove or cook top. As shown in FIG. 1, the cooking vessel 20 has a generally cylindrical side wall 80 and a generally flat bottom 82. The side wall 80 is made of a non ferrous material and the flat bottom 82 may be either a ferrous or non ferrous material.

The source of electromagnetic radiation 24 may be spaced apart from the container 20 as is shown in FIG. 1 or alternatively it may be attached to the generally cylindrical side wall of the container. A plurality of sources of electromagnetic radiation may 24 be utilized.

The support structure 22 is a key element of the present invention and is preferably made of a non-ferrous material which is capable of withstanding typical cooking temperatures. Appropriate materials for the support structure 22 have been found to be glass, aluminum and certain woods.

Figure 2:
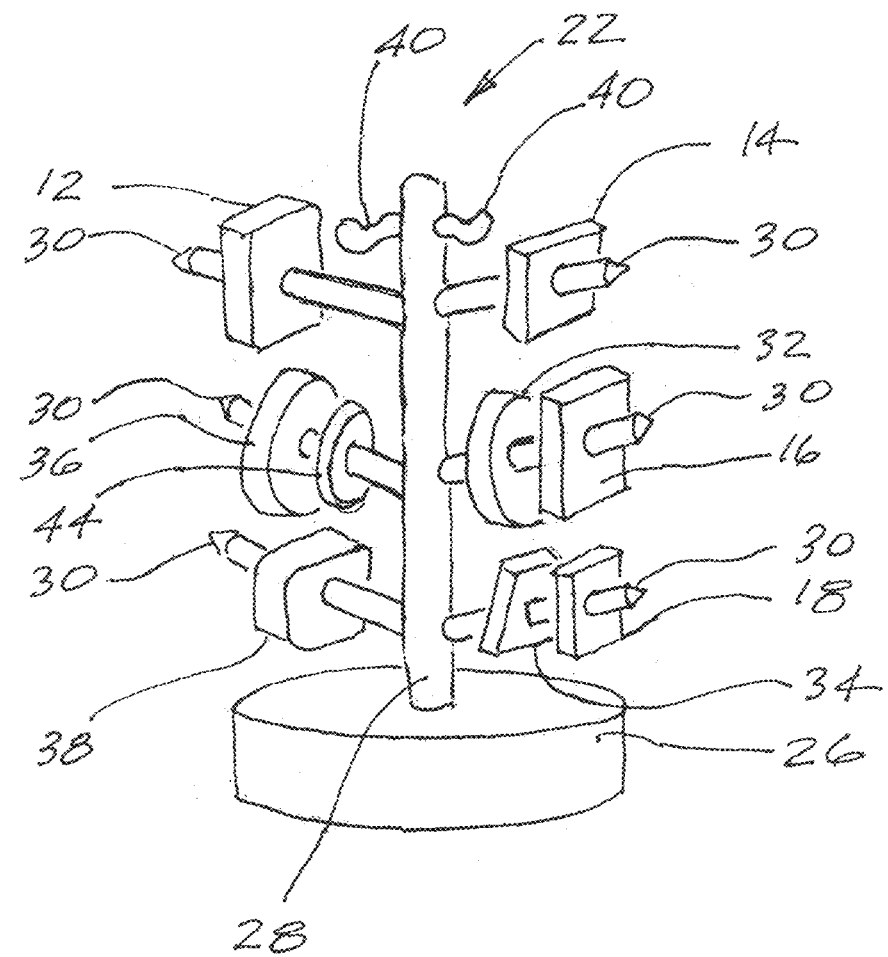
FIG. 2 is a perspective view of the support structure shown in FIG. 1 with the support structure shown removed from the cooking vessel.

As is best shown in FIGS. 1 and 2, the support structure 22 includes a base 26 and a central column 28 which projects upwardly from the base 26.

Along the central column 28 there is a plurality of branches 30 or hooks 40 on which ferrous elements 32, 34, 36, 38 or similar materials may be removably affixed according to the wishes of the person preparing the food. The food being cooked may be affixed to selected branches 30 by allowing the end of the branch 30 to pierce the solid food.

Figure 4:
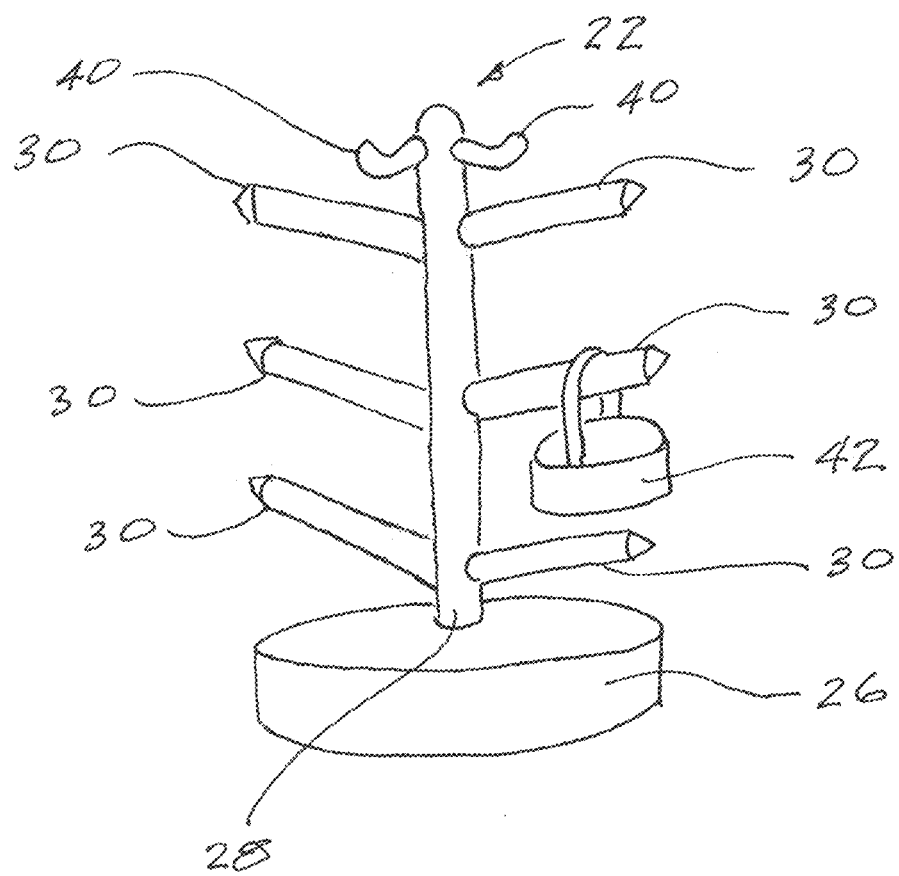
FIG. 4 shows a pail mounted on the support structure.

A ferrous or non-ferrous dish or pail 42 may be hung from a selected branch as shown in FIG. 4. Food of a loose or soft or liquid consistency may be placed in the pail 42 for the purpose of cooking.

During use, the ferrous elements 32, 34, 36, 38, which are hung from selected branches 30 of the support structure 22, are heated by induction in order to create the desired heating pattern. The ferrous elements 32, 34, 36, 38 may be of various shapes and number according to the cooking application. Included in these shapes are rectangular, circular, ellipsoidal, triangular and regular and irregular geometrical shapes. The size of the ferrous elements 32, 34, 36, 38 and the relative proximity of the ferrous elements 32, 34, 36, 38 to the food being cooked may be adjusted or varied by a user in order to create a desired heating pattern.

Figure 3:
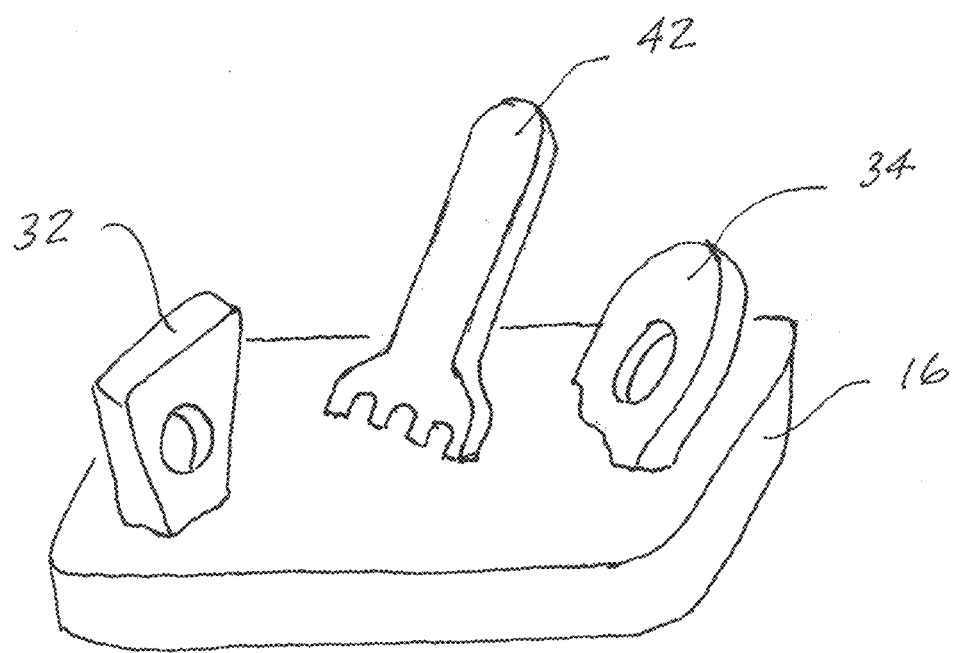
FIG. 3 is an alternative embodiment of the invention in which ferrous elements are inserted directly into food.

The ferrous element may also have various configurations including a household item such as an eating utensil 42 as is shown in FIG. 3.

During use, the source of electro-magnetic energy 24 creates heat within the ferrous elements 32, 34, 36, 38.

When a ferrous cooking vessel is used the electro-magnetic radiation source can also create heat in the cooking vessel 20.

The ability to vary the size, shape and proximity of the ferrous elements 32, 34, 36, 38 to the food being cooked results in a previously unavailable level of precision and control in the preparation of food.

In another embodiment shown in FIG. 3, solid foods for which structures and hanging ferrous elements are unsuitable, elements 32, 34, 42 are provided with sharp edges which can be stuck into the food at various places—or inserted into folds at specified locations. The heating (and cooking) will be precise, and once the process is over, the elements 32, 34, 42 are readily removed.

Figure 5:
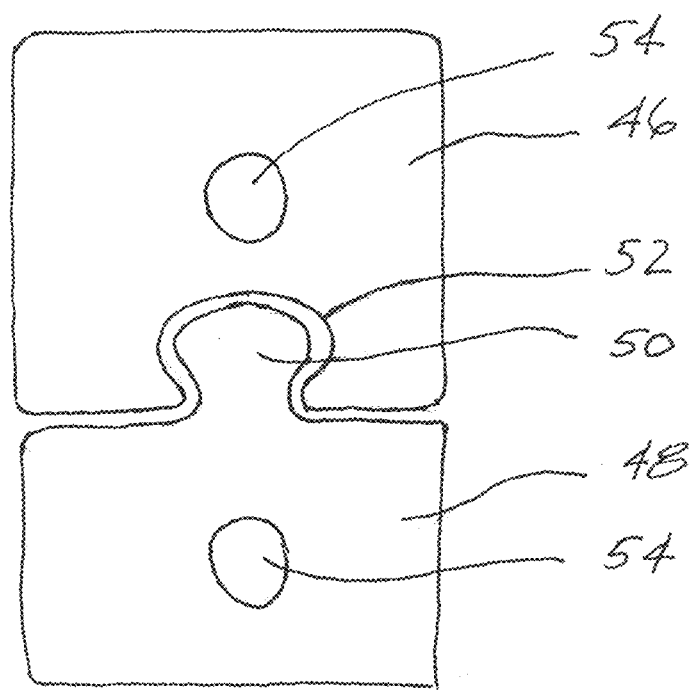
FIG. 5 sows a pair of ferrous elements joined together.

The ferrous elements can have different sizes, shapes compositions and magnetic properties. The ferrous element may be connected one to another either by mounting two or more ferrous elements 36, 44 on a single branch of the support structure as shown in FIG. 4 or alternatively providing a snap together or link together interface as shown in FIG. 5. Ferrous elements 46, 48 can be easily attached and detached as is shown in FIG. 5 ferrous element 48 includes a projecting tongue 50 while ferrous element 46 includes a receptacle 52 which accepts the tongue 50. Ferrous elements 46, 48 include apertures 54 for attachment to a branch 30.

The ability to vary the number, shape orientation and proximity to the food during the cooking process enables the user to achieve a previously unobtainable level of control and precision in the preparation of food.

The present invention also includes an induction cooking oven which is generally similar to the cooking vessel 20 and which is generally rectangular and box-like in configuration having a top, a bottom and four side walls with food disposed on ferrous or non ferrous racks mounted within the oven. Ferrous elements 32 34, 42 are inserted into the food as previously described. A plurality of sources of electro magnetic radiation 24 are disposed on the top wall and the four sidewalls.

The present invention provides a method for induction cooking which includes the following steps:
1. Placing a plurality of ferrous elements in proximity to food;
2. Subjecting the ferrous element and the food to electro-magnetic radiation, thereby enabling the electro-magnetic energy to heat the ferrous elements and allowing the heated ferrous element to transfer heat to the food.

In addition, the present invention provides another method for induction cooking which includes the following steps:
1. Inserting at least one ferrous element into food;
2. Subjecting the ferrous element and the food to electro-magnetic radiation thereby enabling the electro-magnetic energy to heat the at least one ferrous element by induction and allowing the heated ferrous element to transfer heat to the food.

The foregoing specific embodiments of the present invention as set forth in the specifications herein are for illustrative purposes only. Various deviations and modification may be made within the spirit and scope of this invention, without departing from a main theme thereof.

What is claimed is:

1. An induction cooking apparatus comprising:
a cooking vessel;
a support structure disposed in the cooking vessel, wherein the support structure is configured to support food, wherein the support structure comprises a base, a central pole projecting from the base, and a plurality of branches each projecting from the central pole;
a plurality of ferrous members removably mounted to the support structure, wherein the plurality of ferrous members are configured to heat the food, and wherein each of the plurality of ferrous members includes an aperture for mounting the plurality of ferrous members on at least one of the plurality of branches; and
an electro-magnetic radiation source configured to heat the ferrous members.

2. The induction cooking apparatus of claim 1, wherein the plurality of ferrous members each have a regular geometrical shape.

3. The induction cooking apparatus of claim 1, wherein the plurality of ferrous members each have an irregular geometrical shape.

4. The induction cooking apparatus of claim 1, wherein at least two of the plurality of ferrous members comprise an interlocking interface configured to connect the at least two of the plurality of ferrous members.

5. The induction cooking apparatus of claim 1, further comprising a pail configured to mount to one of the plurality of branches.

6. The induction cooking apparatus of claim 1, wherein the cooking vessel comprises a side wall and a bottom wall, and wherein the sidewall and the bottom wall are made of a non-ferrous material.

7. The induction cooking apparatus of claim 1, wherein the cooking vessel comprises a side wall and a bottom wall, wherein the sidewall is made of a non-ferrous material, and wherein the bottom wall comprises a ferrous material.

8. The induction cooking apparatus of claim 1, wherein the cooking vessel comprises a side wall having an outer surface and a plurality of electro-magnetic radiation sources mounted to the outer surface of the side wall.

9. The induction cooking apparatus of claim 1, wherein the cooking vessel comprises a pot.

10. The induction cooking apparatus of claim 1, wherein the support structure is configured to support the food from a middle portion of the food.

11. The induction cooking apparatus of claim 1, wherein the support structure is made of a non-ferrous material.

12. The induction cooking apparatus of claim 11, wherein the non-ferrous material comprises at least one of glass, aluminum, or wood.

13. The induction cooking apparatus of claim 1, wherein at least one of the plurality of branches is configured to pierce the food.

14. The induction cooking apparatus of claim 1, wherein the plurality of ferrous members vary in both size and shape such that a desired cooking pattern can be achieved.

15. The induction cooking apparatus of claim 1, further comprising an insertable ferrous member configured to be inserted into the food such that the insertable ferrous member cooks the food from within.

\* \* \* \* \*